(12) United States Patent
Orth

(10) Patent No.: US 8,452,255 B2
(45) Date of Patent: May 28, 2013

(54) FIELD DEVICE WITH DYNAMICALLY ADJUSTABLE POWER CONSUMPTION RADIO FREQUENCY COMMUNICATION

(75) Inventor: Kelly M. Orth, Apple Valley, MN (US)

(73) Assignee: Rosemount Inc., Chanhassen, MN (US)

( * ) Notice: Subject to any disclaimer, the term of this patent is extended or adjusted under 35 U.S.C. 154(b) by 1283 days.

(21) Appl. No.: 11/475,726

(22) Filed: Jun. 27, 2006

(65) Prior Publication Data

US 2006/0290328 A1  Dec. 28, 2006

Related U.S. Application Data

(60) Provisional application No. 60/694,201, filed on Jun. 27, 2005.

(51) Int. Cl.
*H04M 1/00* (2006.01)

(52) U.S. Cl.
USPC ......... 455/343.5; 455/127.1; 455/127.5; 455/522; 370/465; 713/320; 713/324; 702/138; 702/188; 361/54; 361/57; 323/220; 73/1.57; 73/1.73

(58) Field of Classification Search
USPC ... 323/273, 220; 370/465, 225, 311; 361/796, 361/54, 57; 340/870.16, 870.39; 709/253; 455/574, 343.5; 73/1.57, 1.73; 702/138, 188; 713/320, 324
See application file for complete search history.

(56) References Cited

U.S. PATENT DOCUMENTS

| | | | |
|---|---|---|---|
| 2,533,339 A | 12/1950 | Willenborg | 177/311 |
| 2,883,489 A | 4/1959 | Eadie, Jr. et al. | 335/148 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,612,851 A | 10/1971 | Fowler | 362/30 |
| 3,697,835 A | 10/1972 | Satori | 317/246 |
| D225,743 S | 1/1973 | Seltzer | D10/102 |
| 3,742,450 A | 6/1973 | Weller | 375/257 |
| 3,808,480 A | 4/1974 | Johnston | 317/256 |

(Continued)

FOREIGN PATENT DOCUMENTS

| | | |
|---|---|---|
| DE | 3340834 A1 | 5/1985 |
| DE | 196 22 295 | 5/1996 |

(Continued)

OTHER PUBLICATIONS

Office Action from Russian Patent Office in Russian U.S. Appl. No. 2006145434.

(Continued)

*Primary Examiner* — Allahyar Kasraian
(74) *Attorney, Agent, or Firm* — Westman, Champlin & Kelly P.A.

(57) ABSTRACT

A field device for use in an industrial process control or monitoring system includes terminals configured to connect to a two-wire process control loop configured to carry data and to provide power. In one embodiment, RF circuitry in the field device is configured for radio frequency communication having variable power consumption. In another embodiment, the RF circuitry is coupled to the field device through a separate digital communication bus. A method of modulating the power of RF communication based upon a process communication signal is also provided.

15 Claims, 4 Drawing Sheets

U.S. PATENT DOCUMENTS

| | | | | |
|---|---|---|---|---|
| 3,924,219 | A | 12/1975 | Braun | 338/34 |
| 4,008,619 | A | 2/1977 | Alcaide et al. | 73/398 |
| 4,158,217 | A | 6/1979 | Bell | 361/283 |
| 4,168,518 | A | 9/1979 | Lee | 361/283 |
| 4,177,496 | A | 12/1979 | Bell et al. | 361/283 |
| 4,227,419 | A | 10/1980 | Park | 73/724 |
| 4,287,553 | A | 9/1981 | Braunlich | 361/283 |
| 4,322,775 | A | 3/1982 | Delatorre | 361/283 |
| 4,336,567 | A | 6/1982 | Anastasia | 361/283 |
| 4,358,814 | A | 11/1982 | Lee et al. | 361/283 |
| 4,370,890 | A | 2/1983 | Frick | 73/718 |
| 4,389,895 | A | 6/1983 | Rud, Jr. | 73/724 |
| 4,422,125 | A | 12/1983 | Antonazzi et al. | 361/283 |
| 4,422,335 | A | 12/1983 | Ohnesorge et al. | 73/724 |
| 4,434,451 | A | 2/1984 | Delatorre | 361/283 |
| 4,455,874 | A | 6/1984 | Paros | 73/704 |
| 4,458,537 | A | 7/1984 | Bell et al. | 73/718 |
| 4,475,047 | A | 10/1984 | Ebert, Jr. | 307/66 |
| 4,490,773 | A | 12/1984 | Moffatt | 361/283 |
| 4,542,436 | A | 9/1985 | Carusillo | 361/283 |
| 4,562,742 | A | 1/1986 | Bell | 73/718 |
| 4,590,466 | A | 5/1986 | Wiklund et al. | 340/870.28 |
| 4,670,733 | A | 6/1987 | Bell | 338/36 |
| 4,701,938 | A | 10/1987 | Bell | 375/257 |
| 4,704,607 | A | 11/1987 | Teather et al. | 340/825.07 |
| 4,749,993 | A | 6/1988 | Szabo et al. | 340/870.31 |
| 4,785,669 | A | 11/1988 | Benson et al. | 73/718 |
| 4,860,232 | A | 8/1989 | Lee et al. | 364/571.04 |
| 4,875,369 | A | 10/1989 | Delatorre | 73/151 |
| 4,878,012 | A | 10/1989 | Schulte et al. | 324/60 |
| 4,926,674 | A | 5/1990 | Fossum et al. | 73/4 |
| 4,951,174 | A | 8/1990 | Grantham et al. | 361/283.1 |
| 4,977,480 | A | 12/1990 | Nishihara | 73/724 |
| 4,982,412 | A | 1/1991 | Gross | 377/6 |
| 5,025,202 | A | 6/1991 | Ishii et al. | 320/101 |
| 5,060,295 | A | 10/1991 | Borras et al. | 455/186 |
| 5,094,109 | A | 3/1992 | Dean et al. | 73/718 |
| D331,370 | S | 12/1992 | Williams | D10/46 |
| 5,168,419 | A | 12/1992 | Delatorre | 361/283 |
| 5,194,819 | A | 3/1993 | Briefer | 73/718 |
| 5,230,250 | A | 7/1993 | Delatorre | 73/733 |
| 5,233,875 | A | 8/1993 | Obermeier et al. | 73/718 |
| D345,107 | S | 3/1994 | Williams | D10/46 |
| 5,329,818 | A | 7/1994 | Frick et al. | 73/708 |
| 5,492,016 | A | 2/1996 | Pinto et al. | 73/724 |
| 5,495,769 | A | 3/1996 | Broden et al. | 73/18 |
| 5,506,757 | A * | 4/1996 | Brorby | 361/796 |
| 5,542,300 | A | 8/1996 | Lee | 73/724 |
| 5,554,809 | A | 9/1996 | Tobita et al. | 73/700 |
| 5,606,513 | A | 2/1997 | Louwagie et al. | 702/138 |
| 5,610,552 | A | 3/1997 | Schlesinger et al. | 327/560 |
| 5,637,802 | A | 6/1997 | Frick et al. | 73/724 |
| 5,642,301 | A | 6/1997 | Warrior et al. | 364/571.02 |
| 5,656,782 | A | 8/1997 | Powell, II et al. | 73/756 |
| 5,665,899 | A | 9/1997 | Willcox | 73/1.63 |
| 5,682,476 | A * | 10/1997 | Tapperson et al. | 370/225 |
| 5,705,978 | A | 1/1998 | Frick et al. | 340/511 |
| 5,757,608 | A | 5/1998 | Bernot et al. | 361/283.4 |
| 5,787,120 | A | 7/1998 | Louagie et al. | 375/257 |
| 5,793,963 | A | 8/1998 | Tapperson et al. | 395/200.31 |
| 5,851,083 | A | 12/1998 | Palan | 403/337 |
| 5,870,695 | A | 2/1999 | Brown et al. | 702/138 |
| 5,872,494 | A | 2/1999 | Palan et al. | 333/252 |
| 5,899,962 | A | 5/1999 | Louwagie et al. | 702/138 |
| 5,911,162 | A | 6/1999 | Denner | 73/718 |
| 5,954,526 | A | 9/1999 | Smith | 439/136 |
| 5,978,658 | A | 11/1999 | Shoji | 455/66 |
| 5,992,240 | A | 11/1999 | Tsuruoka et al. | 73/718 |
| 6,038,927 | A | 3/2000 | Karas | 73/706 |
| 6,079,276 | A | 6/2000 | Frick et al. | 73/18 |
| D439,177 | S | 3/2001 | Fandrey et al. | D10/46 |
| D439,178 | S | 3/2001 | Fandrey et al. | D10/46 |
| D439,179 | S | 3/2001 | Fandrey et al. | D10/46 |
| D439,180 | S | 3/2001 | Fandrey et al. | D10/85 |
| D439,181 | S | 3/2001 | Fandrey et al. | D10/46 |
| D441,672 | S | 5/2001 | Fandrey et al. | D10/52 |
| 6,236,096 | B1 | 5/2001 | Chang et al. | 257/419 |
| 6,295,875 | B1 | 10/2001 | Frick et al. | 73/718 |
| 6,338,283 | B1 | 1/2002 | Blazquez Navarro | 73/865.8 |
| 6,429,786 | B1 | 8/2002 | Bansemir et al. | 340/870.27 |
| 6,441,747 | B1 * | 8/2002 | Khair et al. | 340/870.16 |
| 6,457,367 | B1 | 10/2002 | Behm et al. | 73/753 |
| 6,484,107 | B1 | 11/2002 | Roper et al. | 702/50 |
| 6,487,912 | B1 | 12/2002 | Behm et al. | 73/753 |
| 6,504,489 | B1 | 1/2003 | Westfield et al. | 340/870.3 |
| 6,508,131 | B2 | 1/2003 | Frick | 73/756 |
| 6,510,740 | B1 | 1/2003 | Behm et al. | 73/708 |
| 6,511,337 | B1 | 1/2003 | Fandrey et al. | 439/320 |
| D471,829 | S | 3/2003 | Dennis et al. | D10/85 |
| D472,831 | S | 4/2003 | Dennis et al. | D10/85 |
| 6,546,805 | B2 | 4/2003 | Fandrey et al. | 73/753 |
| 6,553,076 | B1 | 4/2003 | Huang | 375/257 |
| 6,568,279 | B2 | 5/2003 | Behm et al. | 73/753 |
| 6,571,132 | B1 | 5/2003 | Davis et al. | 700/2 |
| 6,574,515 | B1 | 6/2003 | Kirkpatrick et al. | 700/19 |
| 6,593,857 | B1 | 7/2003 | Roper et al. | 340/870.3 |
| 6,609,427 | B1 | 8/2003 | Westfield et al. | 73/753 |
| 6,662,662 | B1 | 12/2003 | Nord et al. | 73/715 |
| 6,711,446 | B2 | 3/2004 | Kirkpatrick et al. | 700/19 |
| 6,765,968 | B1 | 7/2004 | Nelson et al. | 375/257 |
| 6,774,814 | B2 | 8/2004 | Hilleary | 340/870.07 |
| 6,839,546 | B2 | 1/2005 | Hedtke | 455/67.11 |
| 6,891,838 | B1 | 5/2005 | Petite et al. | 370/401 |
| 6,898,980 | B2 | 5/2005 | Behm et al. | 73/756 |
| 6,907,383 | B2 | 6/2005 | Eryurek et al. | 702/183 |
| 6,995,685 | B2 * | 2/2006 | Randall | 340/870.39 |
| 7,010,294 | B1 | 3/2006 | Pyotsia et al. | 455/420 |
| 7,058,542 | B2 | 6/2006 | Hauhia et al. | 702/183 |
| 7,109,883 | B2 | 9/2006 | Trimble et al. | 340/870.16 |
| 7,233,745 | B2 | 6/2007 | Loechner | 398/128 |
| 7,262,693 | B2 | 8/2007 | Karschnia et al. | 340/508 |
| 7,271,679 | B2 | 9/2007 | Lundberg et al. | 333/24 |
| 2001/0025349 | A1 | 9/2001 | Sharood et al. | 713/340 |
| 2002/0005713 | A1 * | 1/2002 | Klofer et al. | 324/103 P |
| 2002/0011115 | A1 | 1/2002 | Frick | 73/718 |
| 2002/0029130 | A1 | 3/2002 | Eryurek et al. | 702/183 |
| 2002/0065631 | A1 | 5/2002 | Loechner | 702/188 |
| 2002/0082799 | A1 | 6/2002 | Pramanik | 702/130 |
| 2002/0095520 | A1 * | 7/2002 | Wettstein et al. | 709/253 |
| 2002/0097031 | A1 * | 7/2002 | Cook et al. | 323/273 |
| 2002/0105968 | A1 * | 8/2002 | Pruzan et al. | 370/465 |
| 2002/0163323 | A1 | 11/2002 | Kasai et al. | 323/284 |
| 2003/0171827 | A1 | 9/2003 | Keyes, IV et al. | 700/19 |
| 2003/0204371 | A1 | 10/2003 | Sciamanna | 702/183 |
| 2004/0086021 | A1 | 5/2004 | Litwin | 374/120 |
| 2004/0124854 | A1 | 7/2004 | Slezak | 324/644 |
| 2004/0184517 | A1 | 9/2004 | Westfield et al. | 375/219 |
| 2004/0199681 | A1 | 10/2004 | Hedtke | 710/37 |
| 2004/0203434 | A1 | 10/2004 | Karschnia et al. | 455/67.11 |
| 2004/0211456 | A1 | 10/2004 | Brown et al. | 136/243 |
| 2004/0259533 | A1 | 12/2004 | Nixon et al. | 455/414.1 |
| 2005/0017602 | A1 | 1/2005 | Arms et al. | 310/339 |
| 2005/0056106 | A1 | 3/2005 | Nelson et al. | 73/866.3 |
| 2005/0072239 | A1 | 4/2005 | Longsdorf et al. | 73/649 |
| 2005/0130605 | A1 * | 6/2005 | Karschnia et al. | 455/90.3 |
| 2005/0164684 | A1 | 7/2005 | Chen et al. | 455/414.1 |
| 2005/0201349 | A1 | 9/2005 | Budampati | 370/342 |
| 2005/0240784 | A1 * | 10/2005 | Sugasawa | 713/300 |
| 2005/0245291 | A1 | 11/2005 | Brown et al. | 455/572 |
| 2005/0276233 | A1 | 12/2005 | Shepard et al. | 370/254 |
| 2005/0281215 | A1 | 12/2005 | Budampati et al. | 370/328 |
| 2005/0289276 | A1 | 12/2005 | Karschnia et al. | 710/305 |
| 2006/0002368 | A1 | 1/2006 | Budampati et al. | 370/351 |
| 2006/0036404 | A1 | 2/2006 | Wiklund et al. | 702/183 |
| 2006/0092039 | A1 | 5/2006 | Saito et al. | 340/825.37 |
| 2006/0116102 | A1 * | 6/2006 | Brown et al. | 455/343.1 |
| 2006/0148410 | A1 * | 7/2006 | Nelson et al. | 455/67.11 |
| 2006/0181406 | A1 | 8/2006 | Petite et al. | 340/521 |
| 2006/0194547 | A1 * | 8/2006 | Davis | 455/69 |
| 2006/0227729 | A1 | 10/2006 | Budampati et al. | 370/278 |
| 2006/0274644 | A1 | 12/2006 | Budampati et al. | 370/216 |
| 2006/0274671 | A1 | 12/2006 | Budampati et al. | 370/254 |
| 2006/0287001 | A1 | 12/2006 | Budampati et al. | 455/552.1 |
| 2007/0030816 | A1 | 2/2007 | Kolavennu | 370/252 |
| 2007/0030832 | A1 | 2/2007 | Gonia et al. | 370/338 |
| 2007/0229255 | A1 | 10/2007 | Loechner | 340/540 |
| 2007/0233283 | A1 | 10/2007 | Chen | 700/17 |

| | | | | |
|---|---|---|---|---|
| 2007/0237137 | A1 | 10/2007 | McLaughlin | 370/389 |
| 2007/0280144 | A1 | 12/2007 | Hodson et al. | 370/312 |
| 2007/0280178 | A1 | 12/2007 | Hodson et al. | 370/338 |
| 2007/0280286 | A1 | 12/2007 | Hodson et al. | 370/466 |
| 2007/0280287 | A1 | 12/2007 | Samudrala et al. | 370/466 |
| 2007/0282463 | A1 | 12/2007 | Hodson et al. | 700/20 |
| 2007/0288204 | A1 | 12/2007 | Gienke et al. | 702/188 |

FOREIGN PATENT DOCUMENTS

| | | | |
|---|---|---|---|
| DE | 101 04 582 A1 | 10/2001 | |
| DE | 102 21 931 A1 | 5/2002 | |
| EP | 0 518 916 B1 | 2/1991 | |
| EP | 0 524 550 A1 | 1/1993 | |
| EP | 0 895 209 A1 | 2/1999 | |
| EP | 1202145 | 10/2000 | 19/418 |
| EP | 1 202 145 A1 | 5/2002 | |
| EP | 1 192 614 | 1/2003 | |
| EP | 1 293 853 A1 | 3/2003 | |
| JP | 02067794 | 7/1990 | |
| JP | 2000-304148 | 11/2000 | |
| JP | 2003/042881 | 2/2003 | |
| JP | 2003051894 | 2/2003 | |
| JP | 2003-070079 | 3/2003 | |
| JP | 2003134261 | 5/2003 | |
| JP | 2004021877 | 1/2004 | |
| JP | 2004-317593 | 11/2004 | |
| JP | 2005-207648 | 8/2005 | |
| WO | WO 91/13417 | 9/1991 | |
| WO | WO 95/07522 | 3/1995 | |
| WO | WO 99/53286 | 10/1999 | |
| WO | WO 03/023536 | 3/2003 | |
| WO | WO 03/089881 | 10/2003 | |
| WO | WO 2004/023423 | 3/2004 | |
| WO | WO 2004/094892 | 11/2004 | |
| WO | WO 2005/060482 | 7/2007 | |

OTHER PUBLICATIONS

Office Action from U.S. Patent Office in U.S. Appl. No. 11/028,486.
First Communication issued by the European Patent Office in German Application No. 06774208.0.
XP 002400076.
"Wireless R&D Aims to Boos Traffic," by M. Moore, InTech with Industrial Computing, Feb. 2002, pp. 40-41.
"System Checks Farawy Machines' Health," by J. Strothman, InTech with Industrial Computing, Feb. 2002, pp. 42-43.
Notification of Transmittal of the International Search Report or the Declaration—PCT/US03/10403.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pgs. Ii, iii, iv and 1-12, Dec. 2003.
International Search Report and Written Opinion of Application No. PCT/US2005/015848, filed May 5, 2005.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
Notification of Transmittal of the International Search Report and the Written Opinion—PCT/US2005/021757.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022,Rev AA, Jul. 2002, "Model 4600 Oil & Gas Panel Transmitter," 65 pages.
Transmitter Schematic, Sold Jul. 2002, 5 pages.
Notification of Transmittal of the International Search Report and the Written Opinion of the International Searching Authority for International Application No. PCT/US2005/007328 filed Mar. 7, 2005. Date of Mailing: Jan. 12, 2006.
4 Pages from Website http://content.honeywell.com/imc/eznews/eznews0403/news.htm, 2004.
Notification of Transmittal of the International Search Report and the Written Opinion of the International Searching Authority for International Application No. PCT/US2006/025206 filed Jun. 27, 2006.
"Mechatronic Drives in Mobile Hydraulics," Internet Article, Soncebox News. No. 4, Oct. 2004.
Office Action from U.S. Appl. No. 11/028,486 dated May 9, 2008.
First Office Action for Chinese patent application 200680015575.4, filed Jun. 27, 2006.
Official Action for Russian patent application No. 2008103014, filed Jun. 27, 2006.
Second Office Action for Chinese patent application No. 200680015575.4, dated Sep. 25, 2009.
Third Office Action for Chinese Patent Application No. 200680015575.4 dated May 11, 2010.
First Office Action (Notification of Reasons for Rejection) for Japanese patent application No. 2008-518521 dated Aug. 24, 2010.
First Examination Report from the related Indian patent application No. 9/MUMNP/2008 dated Jan. 3, 2012. 1 page.
Decision to Refuse from a corresponding European patent application No. 06774208.0 dated Apr. 2, 2012.
Provision of the Minutes from the corresponding European patent application No. 06774208.0 dated Apr. 2, 2012.
Fourth Office Action for Chinese patent application No. 200680015575.4 dated Jun. 9, 2011.
Summons to attend Oral Proceedings for corresponding European patent application No. 06774208.0 dated Nov. 7, 2011.
Office Action from the corresponding Canadian patent application No. 2602758 dated Oct. 10, 2012. 5 pages.

* cited by examiner

FIELD DEVICE WITH DYNAMICALLY ADJUSTABLE POWER CONSUMPTION RADIO FREQUENCY COMMUNICATION

CROSS-REFERENCE TO RELATED APPLICATION

The present application is based on and claims the benefit of U.S. provisional patent application Ser. No. 60/694,201, filed Jun. 27, 2005, the content of which is hereby incorporated by reference in its entirety.

BACKGROUND

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, in an analog format, a digital format, or a combination of the two.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field device can perform an action under the control of the control room by controlling the magnitude of the current through the loop. In addition to, or in the alternative, the process control loop can carry digital signals used for communication with field devices.

In some installations, wireless technologies have begun to be used to communicate with field devices. For example, completely wireless installations are used in which the field device uses a battery, solar cell, or other technique to obtain power without any sort of wired connection. However, the majority of field devices are hardwired to a process control room and do not use wireless communication techniques.

In field devices that operate on as little as 4 mA, providing sufficient power to generate wireless communications is a challenge. If too much power is consumed by generating the wireless communications, the ability for the field device to properly signal over the current loop may be diminished. Thus, there is a need for improved wireless communication capabilities for field devices that operate on process control loops that use an analog current between 4 and 20 mA.

SUMMARY

A field device for use in an industrial process control or monitoring system includes terminals configured to connect to a two-wire process control loop configured to carry data and to provide power. In one embodiment, RF circuitry in the field device is configured for radio frequency communication having variable power consumption. In another embodiment, the RF circuitry is coupled to the field device through a separate digital communication bus. A method of modulating the power of RF communication based upon a process communication signal is also provided.

DETAILED DESCRIPTION

Embodiments of the present invention generally provide a field device with a wireless communication module for one way or bi-directional wireless communication. The wireless communication module can transmit and/or receive an RF signal from a remote device or location. The module's power consumption is dynamically changeable and is powered by a field device.

Figure 1:
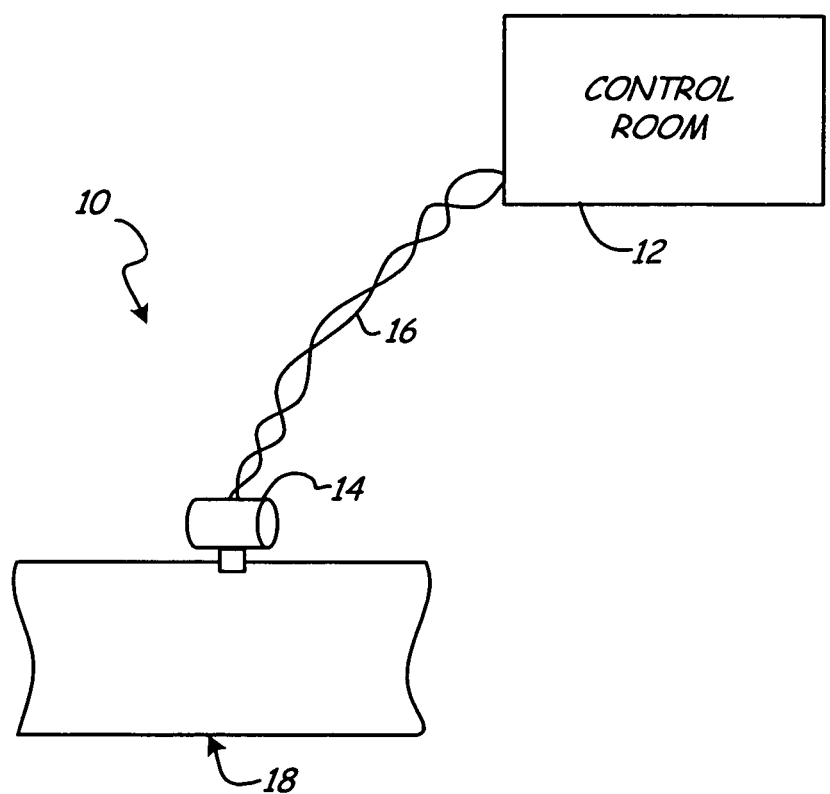
FIG. 1 is a diagrammatic view of a process control and/or monitoring system in which embodiments of the present invention are particularly useful.

FIG. 1 is a diagrammatic view of a process control and/or monitoring system 10 in which embodiments of the present invention are particularly useful. System 10 includes control room 12 that is coupled to field device 14 over a two-wire process control loop 16. Field device 14 is operably coupled to a process fluid container, illustrated diagrammatically as pipe 18, and is configured to determine a process variable relative to the process fluid within pipe 18 and convey information related to the process variable over process control loop 16.

Figure 2:
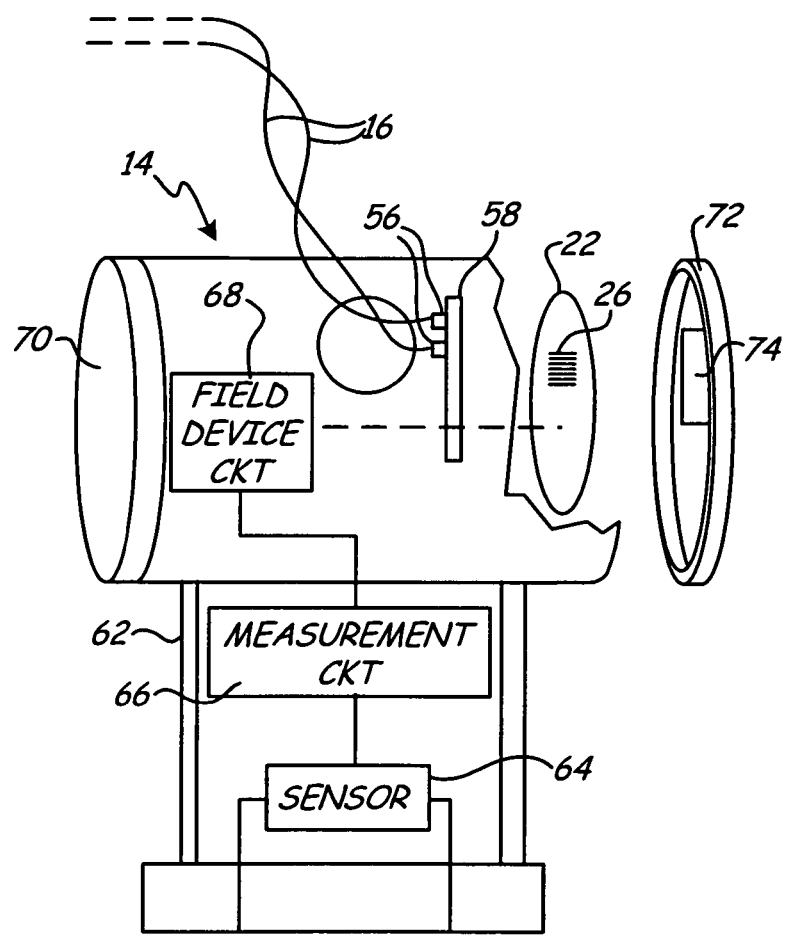
FIG. 2 is a simplified cutaway partially exploded view of a pressure transmitter.

FIG. 2 is a simplified cutaway partially exploded view of pressure transmitter 14, which is one example of a field device. Pressure transmitter 14 couples to two-wire process control loop 16 and includes transmitter housing 62. Process control loop 16 couples to terminals 56 carried on terminal board 58. A pressure sensor 64 provides one example of a transducer and is configured to couple to a process fitting to measure a differential pressure occurring in the process fluid. The output from sensor 64 is provided to measurement circuitry 66 which couples to field device circuit 68. Wireless communication circuitry 22 couples to field device circuitry 68 and may, in some embodiments, couple to process control loop 16.

The housing 62 includes endcap 70 and 72 which can be screwed into housing 62. Endcap 72 includes an RF transparent window 74 configured to align generally with an antenna 26 carried on wireless communication circuitry 22. When attached, endcaps 70 and 72 provide an intrinsically safe enclosure for circuitry within transmitter 14. The materials typically used in endcaps, for example, metal, are not transparent to RF signals. However, RF transparent window 74 allows RF signals to be sent from or received by antenna 26. One example of RF transparent material for use with windows 74 is glass, or the like. However, any appropriate material can be used. The window and housing configuration can help to meet intrinsic safety requirements and provide flameproof or explosion-proof capabilities. Further, the cavity within housing 62 can be configured to provide a desired radiation pattern of RF signals generated by antenna 26. For example, it may be desirable to have the RF transmission be directional in some implementations, or omni-directional in others. In other implementations, cover 62 may be lengthened to provide an additional interior cavity for placement of wireless communication circuitry 22.

Wireless communication circuitry 22 interacts with external wireless devices via antenna 26. Depending upon the application, wireless communication circuitry 22 may be adapted to communicate in accordance with any suitable wireless communication protocol including, but not limited to: wireless networking technologies (such as IEEE 802.15.4 or IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Services (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum technologies.

While FIG. 2 illustrates wireless communication circuitry 22 operably coupled to field device circuitry 68 within field device 14, it is expressly contemplated that wireless communication circuitry 22 may be located remotely therefrom and coupled to field device 14 through a suitable digital communication bus.

Figure 3:
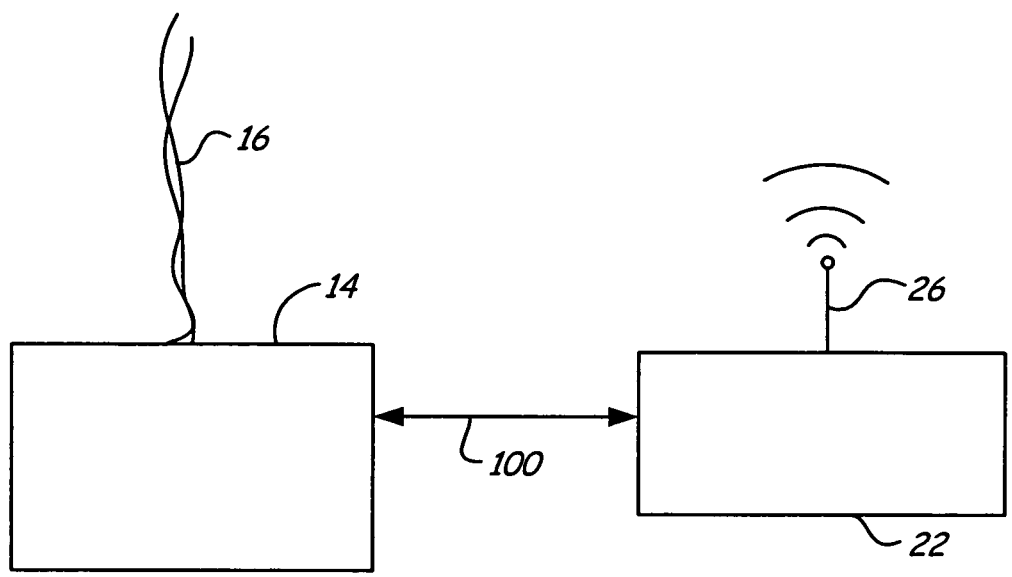
FIG. 3 illustrates a field device operably coupled to a process control loop and to wireless communication circuitry.

FIG. 3 is a diagrammatic view of field device 14 operably coupled to process control loop 16 and to wireless communication circuitry 22, which is disposed remotely from field device 14 through digital communication bus 100. Digital communication bus 100 is preferably a bi-directional bus, but may be unidirectional in instances where bi-directional communication is not necessary, or desired.

In accordance with embodiments of the present invention, wireless communication circuitry 22 is configured to draw varying amounts of electrical power based upon how much power is available to circuitry 22 from field device 14. For example, as set forth above, field devices operating on some process control loops may be required to operate on as low as 4 mA. In such instances, there may be very little, if any additional electrical energy to power wireless communication. Such a situation would exist as long as the conditions requiring the process variable signal to be 4 mA (such as indicating a zero scale or low rail process variable value) is present. Accordingly, such condition may exist for hours or even days. Embodiments of the present invention are generally able to accommodate the significantly variable amounts of excess energy useable for wireless communications. In one embodiment, excess energy that is available when the process control loop current is at a higher value is stored instead of merely discarded. This stored energy can then be used later when the current signal is at its lowest value. The energy may be stored in any suitable device including rechargeable batteries and/or suitable capacitors.

In another embodiment, the actual operation of wireless communication circuitry 22 is varied based upon available power. For example, wireless communication circuitry 22 may go into a sleep mode for a period of time when field device 14 loop current is near 4 mA and little excess power is available as opposed to when the field device loop current is near 12 mA and there is generous excess power available for circuitry 22. Another example of modifying the operation of wireless communication circuitry 22 is changing the communication rate of wireless communication circuitry 22. For example, the communication rate of wireless circuitry 22 may be set or determined as a function of the amount of available excess power that can be delivered to wireless communication circuitry 22. One example of such a function is where the communication rate of wireless communication circuitry 22 is directly proportional to the amount of excess power. Additionally, field device 14 may know or be able to predict how much excess power is available, and it is contemplated that field device 14 can set, via communication with wireless communication circuitry 22, the communication rate of circuitry 22.

In order to simplify process wiring and installation, it is generally preferred that wireless communication module 22 be powered solely from energy available from field device 14. Further still, it is preferred that wireless communication circuitry 22 be powered by virtue of, or through, digital communication bus 100. Communication bus 100 can be any suitable digital communication bus including Controller Area Network (CAN) or Local Interconnect Network (LIN) bus; a Serial Communication Interface (SCI) bus; a Serial Peripheral Interface (SPI) bus; or an $I^2C$ bus.

Figure 4:
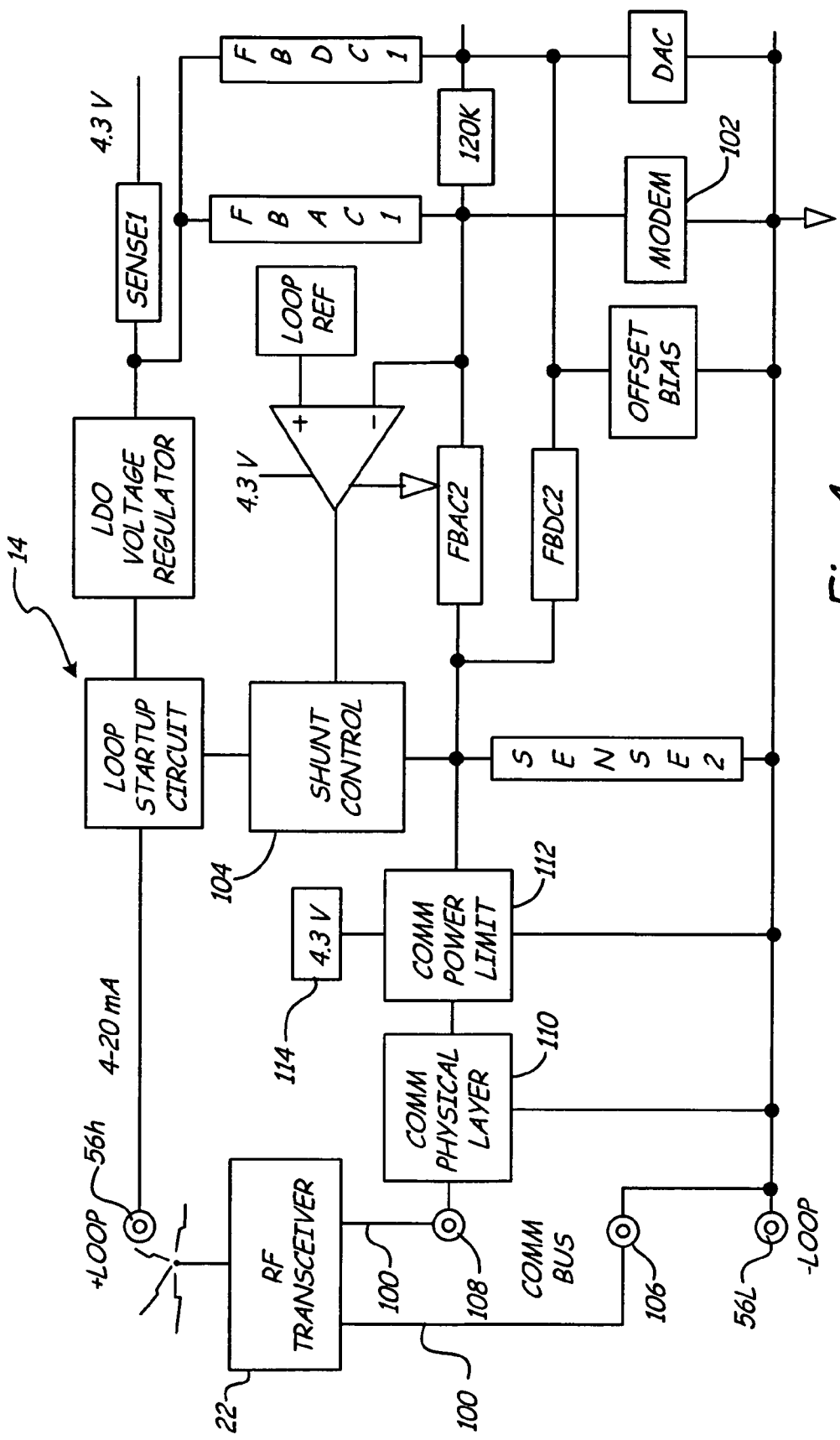
FIG. 4 is a diagrammatic view of a portion of field device circuitry within a field device in accordance with an embodiment of the present invention.

FIG. 4 is a diagrammatic view of a portion of field device circuitry 68 within field device 14 in accordance with an embodiment of the present invention. Field device circuitry 68 includes a digital modem 102 that allows field device 14 to communicate digitally over process control loop 16. In one embodiment, the digital communication is in accordance with the Highway Addressable Remote Transducer (HART®) protocol. Additionally, circuitry 68 includes shunt control module 104 that allows field device 14 to set the amount of current flowing between terminals 56H and 56L to a value between 4 and 20 mA in order to convey process variable information. Field device 14 preferably includes a pair of terminals 106, 108 through which digital communication bus 100 couples wireless communication circuitry 22. Field device 14 also preferably includes communication physical layer 110 that provides for communication in accordance with one of the digital communication bus options listed above. Additionally, field device 14 includes communication power limit module 112 that is operably coupled to high voltage rail 114 and to loop terminal 56L. Communication power limit module 112 is operably coupled to shunt control 104 such that power to the communication physical layer 110 is based upon current drawn by field device 14. As illustrated in FIG. 4, wireless communication circuitry 22 is coupled to terminals 106 and 108 via communication bus 100. As set forth above, wireless communication circuitry 22 can be disposed within field device 14, or located remotely therefrom.

The current required to make a single process measurement while keeping the 4-20 mA electronics and sensor circuitry within field device 14 functioning often requires up to 3.6 mA, which is the maximum limit allowed to meet NAMUR alarm levels. HART-based transmitters use +/−0.5 mA for signaling on the two wire loop, so only 3.1 mA of the 3.6 mA limit should be allocated for the operating current field device 14. In accordance with an embodiment of the present invention, field device 14 employs communication power limit module 112 to limit the electrical power provided for digital communications over digital communication bus 100, and accordingly through wireless communication circuitry 22. For example, when there is 4.0 mA of loop current, 0.7 mA of electrical energy is made available to digital communication bus 100. When there is 6.0 mA of loop current, 1.70 mA is made available to wireless communication circuitry 22 through digital communication bus 100.

As illustrated in FIG. 4, terminal 106 of digital communication bus 100 can be directly coupled to loop terminal 56L. In this embodiment, one of the wires of the two-wire 4-20 mA loop and the two-wire digital communication bus 100 are common. In this instance, the common line of digital communication bus 100 could in fact be coupled directly to the negative or low voltage line of the process communication loop and the interconnection between wireless communication circuitry 22 and field device 14 could be effected via a single wire coupled to terminal 108. In accordance with one embodiment of the present invention, digital communication bus 100 is a controller area network (CAN) bus and circuitry of field device 14 can be in accordance with that found in United States Patent Application Publication Serial Number 2004/0184517 A1, published Sep. 23, 2004 entitled TWO WIRE TRANSMITTER WITH ISOLATED CAN OUTPUT.

Generally, any excess current available above the minimum current required to operate field device 14 can be provided to wireless communication circuitry 22 through digital communication bus 100. Additionally, in embodiments where field device 14 communicates digitally upon process control loop 16, even fleeting increases and decreases in the current, such as those required for digital communication signaling, can be used to increase or decrease the power available for wireless communication.

Although the present invention has been described with reference to preferred embodiments, workers skilled in the art will recognize that changes may be made in form and detail without departing from the spirit and scope of the invention. As used herein, Radio Frequency (RF) can comprise electromagnetic transmissions of any frequency and is not limited to a particular group of frequencies, range of frequencies or any other limitation.

What is claimed is:

1. A field device comprising:
a plurality of electrical terminals coupled to conductors of a process control loop;
field device circuitry including a digital modem allowing the field device to communicate digitally over the process control loop;
a shunt control module operably coupled between the plurality of electrical terminals and configured to control amount of current flowing therethrough;
a communication power limit module operably coupled to the shunt control module to limit power provided to a digital communication bus based on the amount of current;
wherein the digital communication bus is operably coupled between the field device circuitry and wireless communication circuitry, the wireless communication circuitry being configured to operate at varying power levels based upon excess power available from the field device, wherein operation of the wireless communication circuitry is configured to be modified based upon the excess power available from the field device to dynamically change a power consumption rate of the wireless communication circuitry; and
wherein the wireless communication circuitry goes to a sleep mode for a period of time when excess power available from the field device is at a minimum.

2. The field device of claim 1, wherein the wireless communication circuitry is disposed within the field device.

3. The field device of claim 1, wherein the wireless communication circuitry is located remotely from the field device.

4. The field device of claim 1, wherein the digital communication bus is a Controller Area Network bus.

5. The field device of claim 4, wherein the wireless communication circuitry is coupled to the field device through a single conductor.

6. The field device of claim 1, wherein the digital communication bus is a Local Interconnect Network (LIN) bus.

7. The field device of claim 1, wherein the digital communication bus is a Serial Communication Interface (SCI) bus.

8. The field device of claim 1, wherein the digital communication bus is a Serial Peripheral Interface (SPI) bus.

9. The field device of claim 1, wherein the digital communication bus is an $I^2C$ bus.

10. The field device of claim 1, and further comprising an energy storage device.

11. The field device of claim 1, wherein the field device is a process variable transmitter.

12. The field device of claim 1, wherein the wireless communication circuitry communication rate is proportional to the amount of current flowing through the shunt control module.

13. The field device of claim 1, wherein the wireless communication circuitry communication rate is a function of excess power available from the field device.

14. The field device of claim 13, wherein the wireless communication circuitry communication rate is proportional to the excess power.

15. The field device of claim 1, wherein the amount of current flowing through the plurality of terminals, and determined by the shunt control module, is utilized to power the field device.

\* \* \* \* \*